United States Patent
Wang et al.

(10) Patent No.: US 12,093,085 B2
(45) Date of Patent: Sep. 17, 2024

(54) ANTI-GLARE COMPUTING SYSTEM

(71) Applicant: Lenovo (Singapore) Pte. Ltd., Singapore (SG)

(72) Inventors: Mengnan Wang, Chapel Hill, NC (US); Barrett J. Bryson, Raleigh, NC (US); Song Wang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 16/914,979

(22) Filed: Jun. 29, 2020

(65) Prior Publication Data

US 2021/0405708 A1 Dec. 30, 2021

(51) Int. Cl.
*G06F 1/16* (2006.01)
*G08B 5/22* (2006.01)

(52) U.S. Cl.
CPC .......... *G06F 1/1677* (2013.01); *G06F 1/1616* (2013.01); *G06F 1/1637* (2013.01); *G06F 1/1662* (2013.01); *G06F 1/1681* (2013.01); *G06F 1/1686* (2013.01); *G08B 5/22* (2013.01)

(58) Field of Classification Search
CPC .... G06F 1/1677; G06F 1/1616; G06F 1/1637; G06F 1/1662; G06F 1/1681; G06F 1/1686; G06F 1/1618; G08B 5/22
See application file for complete search history.

(56) References Cited

U.S. PATENT DOCUMENTS

| | | | |
|---|---|---|---|
| 2014/0132486 A1* | 5/2014 | Wei | G09G 3/3611 345/31 |
| 2017/0358252 A1* | 12/2017 | Bhageria | G06F 21/84 |
| 2018/0005386 A1* | 1/2018 | Thangappan | A61B 5/11 |
| 2019/0205635 A1* | 7/2019 | Brown | G06V 30/413 |
| 2019/0278339 A1* | 9/2019 | Cooper | G06F 1/165 |
| 2019/0339088 A1* | 11/2019 | Jeswani | G01C 21/3691 |
| 2021/0405710 A1* | 12/2021 | Chuang | G05B 9/02 |
| 2021/0406567 A1* | 12/2021 | Shibata | G06V 40/172 |

\* cited by examiner

*Primary Examiner* — Amr A Awad
*Assistant Examiner* — Maheen I Javed
(74) *Attorney, Agent, or Firm* — Brian J. Pangrle

(57) ABSTRACT

A system can include a display housing that includes a display; a keyboard housing that includes a keyboard, a processor and memory accessible to the processor; a sensor operatively coupled to the processor; a hinge assembly that rotatably couples the display housing and the keyboard housing; and adjustment circuitry that determines a recommended position for adjustment of the display housing with respect to the keyboard housing using sensor data generated by the sensor.

18 Claims, 12 Drawing Sheets

Coordinate System(s) 500

| User Position 522 | Light Source(s) Position(s) 524 | Vibration 526 | Glare 528 |

ANTI-GLARE COMPUTING SYSTEM

TECHNICAL FIELD

Subject matter disclosed herein generally relates to technology for computing systems.

BACKGROUND

Various types of display devices, display systems, computing systems with one or more displays, etc., exist that can be utilized in various environments.

SUMMARY

A system can include a display housing that includes a display; a keyboard housing that includes a keyboard, a processor and memory accessible to the processor; a sensor operatively coupled to the processor; a hinge assembly that rotatably couples the display housing and the keyboard housing; and adjustment circuitry that determines a recommended position for adjustment of the display housing with respect to the keyboard housing using sensor data generated by the sensor. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
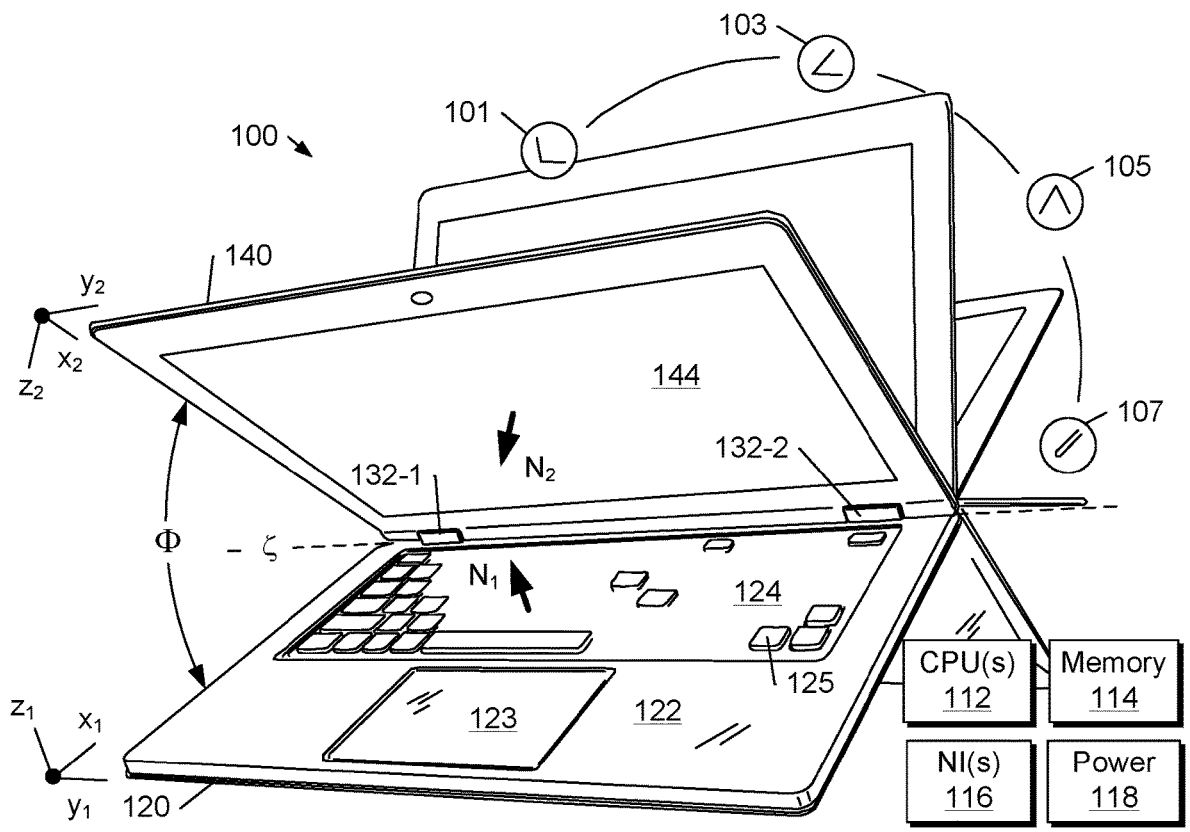
FIG. 1 is a diagram of an example of a system.
Figure 1:
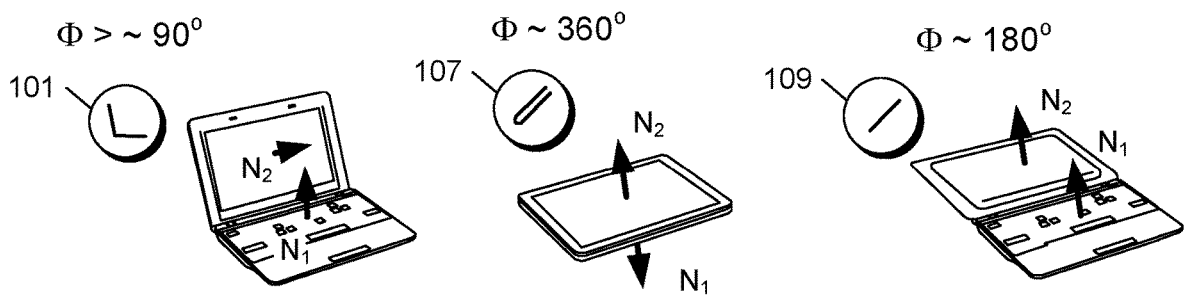

FIG. 1 shows an example of a system 100 that includes a keyboard housing 120 and a display housing 140 that are pivotable with respect to each other via movement about one or more hinges 132-1 and 132-2 (e.g., hinge assemblies). The system 100 may be a device such as, for example, a computing device (e.g., an information handling device).

As an example, the system 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 that includes a display surface. A keyboard can define a plane where the plane can define a normal or normal outward vector ($N_1$) that is perpendicular to the plane that points outwardly. A display or display surface can define a plane where the plane can define a normal or normal outward vector ($N_2$) that is perpendicular to the plane that points outwardly. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing system to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the system 100, the keys 125 may be contacted by the users hand or hands. A user may perceive the springiness of the keys 125 as being somewhat undesirable. For example, springy keys may interfere with a user's ability to comprehend or sense force that is sufficient to grasp the system 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis $\zeta$) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing systems can be characterized at least in part by a footprint. For example, the system 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
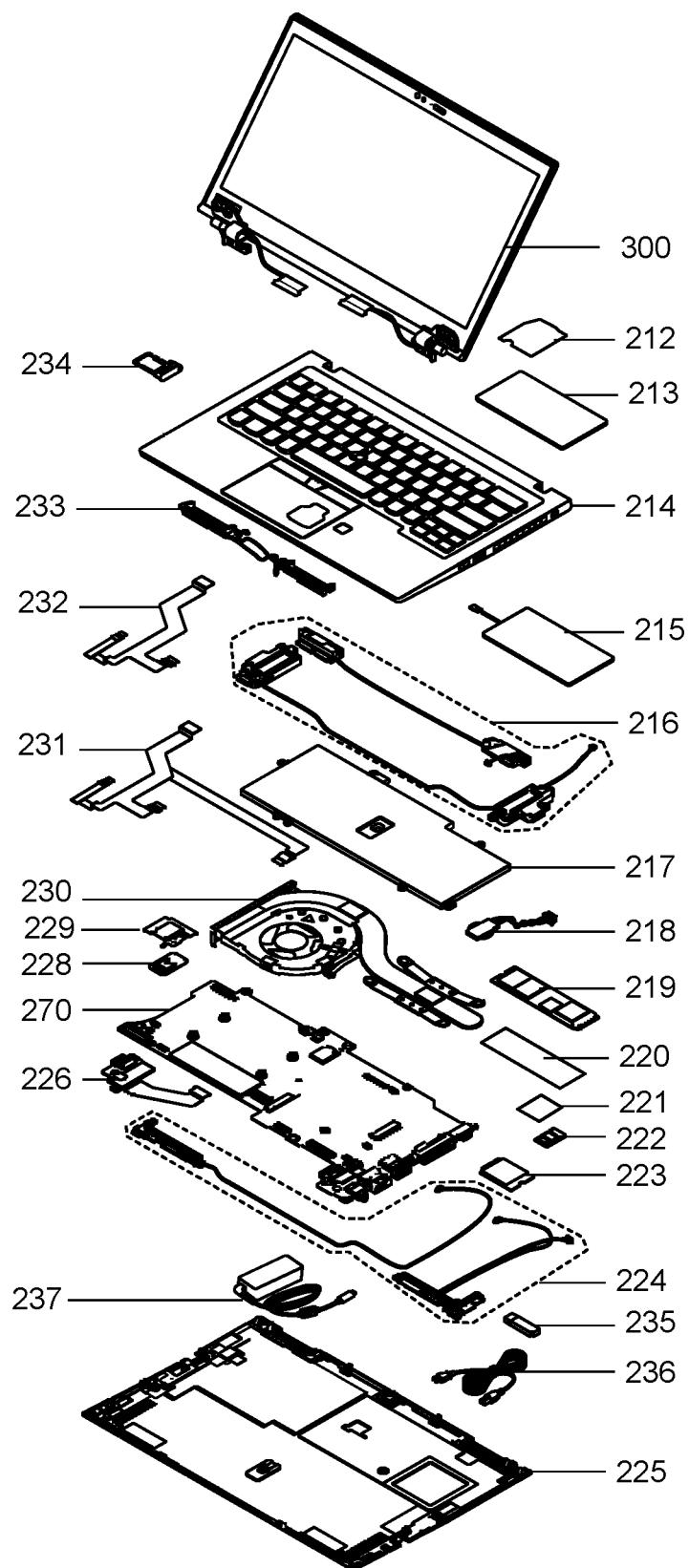
FIG. 2 is a diagram of an example of a system.

FIG. 2 shows an exploded perspective view of a computing system 200 as including various components, which can include, for example, a display assembly 300, insulation trackpad tape 212, a trackpad 213 or 215, a keyboard bezel assembly with keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237.

Figure 3:
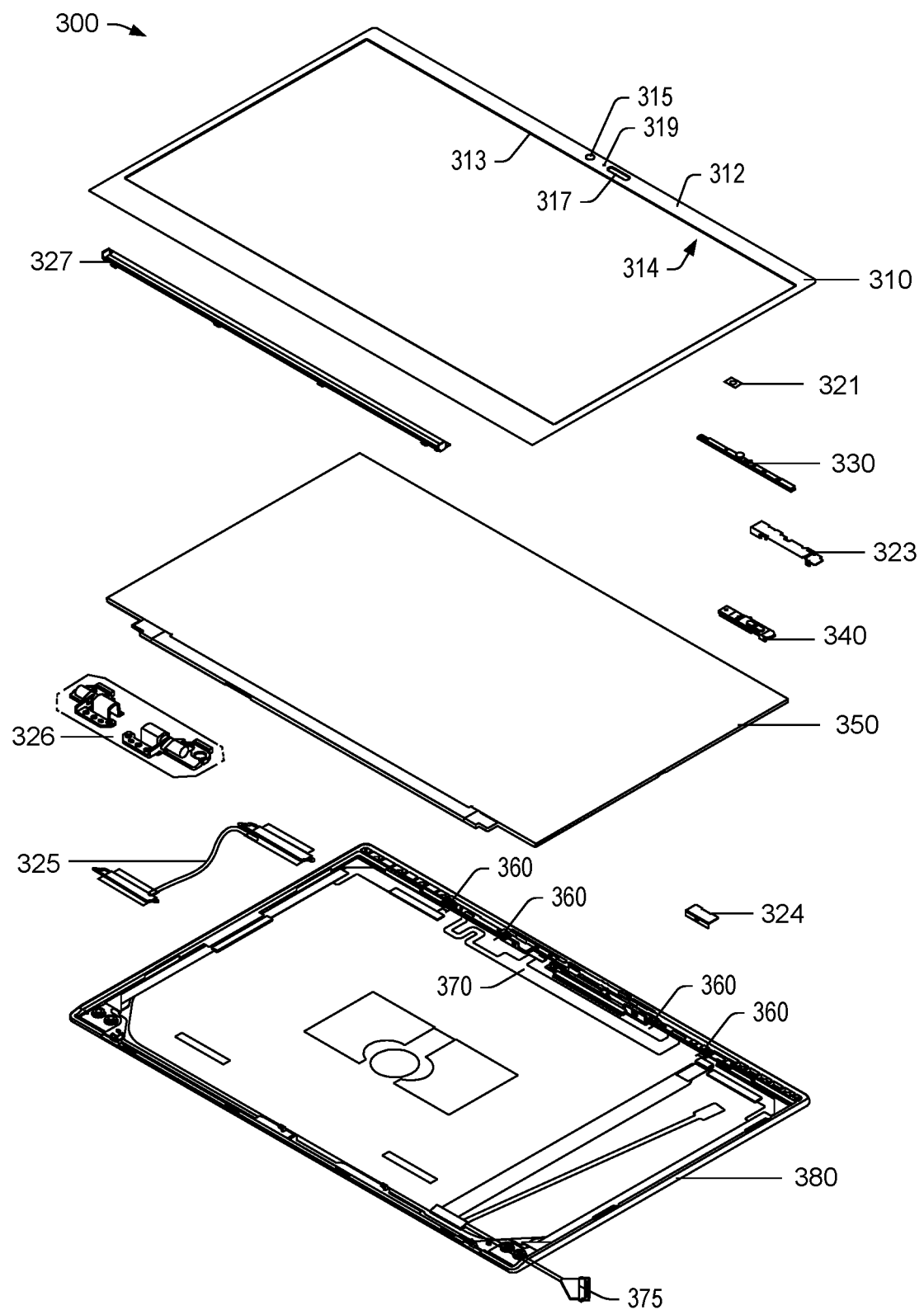
FIG. 3 is a diagram of an example of a display assembly of the system of FIG. 2.

FIG. 3 shows an exploded perspective view of the display assembly 300 of FIG. 2 as including various components, which can include, for example, a bezel 310, a foam component for an IR LED camera 321, a camera module 330, a stopper 323, a shutter 340, a display panel 350, a support plate 324, one or more microphones 360, wiring 370, one or more wiring connectors 375, a back side (rear) cover assembly 380, a display cable 325, hinges 326, and a display bezel frame component 327.

As shown in the example of FIG. 3, each of the hinges 326 can be an assembly of components, which may be referred to as a hinge assembly. In the example of FIG. 2, the hinges 326 are shown as being operatively coupled to the display assembly 300. As an example, a hinge can include an axle and leaves where one leaf can attach to one housing and where another leaf can attach to another housing. As an example, a hinge can include two axles, which may be spaced apart and operatively coupled, for example, via one or more gears. As an example, a swivel hinge may be utilized that can provide for swiveling of a housing such as a display housing about a keyboard housing (see, e.g., the orientation 107 of FIG. 1 where the keys 125 of the keyboard 124 may be oriented to face a back side of the display housing 140, which can be a side opposite a display surface side of the display housing 140).

In the examples of FIG. 2 and FIG. 3, the computing system 100 can include various media capture components. For example, a camera can be a media capture component, a microphone can be a media capture component, etc. A media capture component may be an audio media capture component, a video media capture component, a still image media capture component, etc.

As an example, the computing system 100 can include circuitry for rendering graphics, text, images, etc., to the display 144 of the display housing 140. For example, consider rendering of one or more graphical user interfaces (GUIs), rendering of a still image, rendering of video images, etc. As an example, the computing system 100 can include a graphics integrated circuit, which may be referred to as a graphics processing unit (GPU). Such a circuit may be part of a chipset, a separate chip, etc. As an example, the computing system 100 may include one or more GPUs, which may be utilized for rendering and/or one or more other types of processing.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera module 330 couples to the back side cover assembly 380 where the wiring 370 operatively couples to the camera module 330 and to the one or more microphones 360. The display assembly 300 can be operatively coupled to other circuitry of the computing system 200, for example, via the one or more wiring connectors 375.

In the example of FIG. 3, the display panel 350 can have corresponding specifications. For example, consider specifications such as resolution (e.g., in pixels), which may include, for example, one or more of VGA (e.g., 640×480 at 60, 72, and 75 Hz), SVGA (e.g., 800×600 at 56, 60, 72, and 75 Hz), XGA (e.g., 1024×768 at 60, 70, and 75 Hz), SXGA (e.g., 1280×1024 at 60, 70 and 75 Hz), WXGA+(e.g., 1440×900 at 60 and 75 Hz), HD (e.g., 1920×1080), 4K (e.g., 3840×2160), or higher. As an example, a display panel may be a thin film transistor liquid crystal display panel (TFT LCD), which may be an in plane switching (IPS) display panel, a twisted nematic (TN) display panel or another type of display panel. As an example, a display panel may be an indium gallium zinc oxide-based display panel (IGZO). As an example, a display panel may be a light emitting diode (LED) display panel.

As an example, a display panel may be specified to have one or more viewing angles. A viewing angle can be an angle at which a display can be viewed with acceptable visual performance. In a technical context, the angular range may be referred to as a viewing cone, for example, defined by a multitude of viewing directions. A viewing angle can be measured from one direction to the opposite, for example, giving a maximum of 180 degrees for a flat, one-sided display panel. A display panel may exhibit different behavior in horizontal and vertical axes such that specifications can be provided for maximum usable viewing angles in both directions. Display panels may be designed to facilitate greater viewing angle in a horizontal direction and a smaller angle in a vertical direction (e.g., for an aspect ratio where the horizontal dimension is greater than the vertical dimension).

As an example, a display may include anti-glare material. For example, consider one or more of the 3M™ Anti-Glare Filters (The 3M Company, Maplewood, Minn.). Such material can help to reduce mirror-like reflections from indoor bright lights, for example, by diffusing light to help reduce glare. Such material may also provide a layer of durable protection from dust and scratches. Such material may have a matte finish that may make cleaning easier and may also tend to reduce visibility of fingerprints. Anti-glare material may be polymeric, such as a polymeric film, a polymeric coating, etc. An anti-glare material may be constructed to filter out light reflected from a display (e.g., reducing reflection from a plastic surface, a glass surface, etc.).

As an example, a display can be a glossy display, a matte display or another type of display. A matte surface can include an outer polarizing layer that has coarseness imparted using one or more technologies (e.g., mechanical, chemical, etc.). A matte finish can act to diffuse a portion of ambient light rather than reflecting that portion directly back toward a viewer; noting that a smoother surface (e.g., less surface coarseness or roughness) can act more like a mirror and thereby reflect a greater percentage of ambient light directly back toward a viewer. A matte surface can also affect light emitted by a display panel, which may be detrimental. For example, clarity may be diminished through use of a matte surface (e.g., or other anti-glare material). Additionally, there can be some degree of interference between emitted light and diffused incident light as both interact with a matter surface. In other words, while a desirable reduction in glare may be achieved by the scattering of external light the image produced by a display panel can be affected by the same diffusion process. The diffused ambient light also interferes slightly with the image produced by a display panel, to exacerbate the process. Disadvantage can include a reduction in contrast and color vibrancy, a slight to moderate reduction in sharpness (e.g., depending on thickness and layering of matte surface as well as monitor pixel pitch), more difficult cleaning due to dirt penetration and relative difficulty seeing what is clean and what is dirty, a grainy or hazy texture particularly when displaying white and other light colors, etc.

As mentioned, a display may be a glossy display. A glossy display can include an outer polarizing layer that is substantially smooth (e.g., compared to coarseness or roughness of a matter display). Such a layer can, rather than diffusing ambient light, reflect it back quite directly, which may cause undesirable reflections and glare, particularly under strong direct light. As to an advantage or use of a matte surface, light emitted from a glossy display tends to be relatively unhindered by a strong diffusion processes. And, aside from reflections, a glossy display image can appear richer, more vibrant and unadulterated. A glossy polarizing film may be treated using an anti-reflective (AR) chemical coating such as magnesium fluoride or special polymers which act in part to aid absorption of some of the ambient light. As an example, a glossy display can include a surface laced with silver nanoparticles. Use of silver nanoparticles may aid in absorption of some ambient light, for example, to a slightly greater degree than a conventional anti-reflective chemical coating without impeding image performance.

Some displays may use a very mild matte anti-glare treatment for a display surface. Such an approach may impart a very low haze value of approximately 2 percent to approximately 4 percent. The haze value describes the level of diffusion of light by the surface, with most regular matte surfaces having a value of approximately 25 percent haze or above. The very mild approach can allow for a display to be classified as glossy as light emission and reflection properties most closely align with a glossy surface with slight anti-reflective film. Some displays forgo anti-reflective treatment and include highly reflective glass as the outermost surface. Such an approach can be largely for aesthetic reasons. In general the amount of light reflected by an anti-reflective of a very low haze surface is reduced compared to an untreated glossy surface.

Even though the reflection of ambient light can be reduced by the use of an anti-reflective or very slight anti-glare coating it is not completely eliminated, particularly where light is strong or where rendered display content is dark. If a display is set to a reasonable brightness, ambient light levels are relatively low and little light is falling directly onto the display, reflections may not be an issue. For a glossy display, as light emitted takes a more direct path and is not diffused by a matte surface, a viewer may experience a cleaner and more vibrant image, which can be more fully appreciated under such conditions. As to some advantages in comparison to a matte display, a glossy display can provide for easier cleaning due to lower dirt penetration and higher visibility of grease and dirt, a greater aesthetic appeal, and more direct light emission that can enhance contrast and image vibrancy.

As an example, a display may be a semi-glossy display, which utilizes a matte surface with lesser roughness to provide a smoother appearance, with accompanying lesser diffusion (e.g., a relatively low haze value in a range of approximately 13 percent to approximately 18 percent; whereas a very low haze may be approximately 1 percent to approximately 5 percent). A very low haze approach can retain the "wet" look of a fully glossy display (e.g., as ambient light strikes the surface), though with reduced reflection, particularly under dimmer conditions where reflections that might remain bothersome on a fully glossy display tend to be muted, tending to become blended into rendered content.

Various other types of technologies include use of an extremely thin piece of glass coated on both sides with a highly efficient anti-reflective (AR) material. In such an example, material is layered with 30 ultra-thin film sheets, each sheet a few nanometers thick, and reportedly allowing approximately 99.8 percent light transmittance through the glass while reflecting approximately 0.1 percent of light on each side (e.g., consider 8 percent reflectance per side of a conventional glass sheet), to thereby essentially appear invisible.

Figure 4:
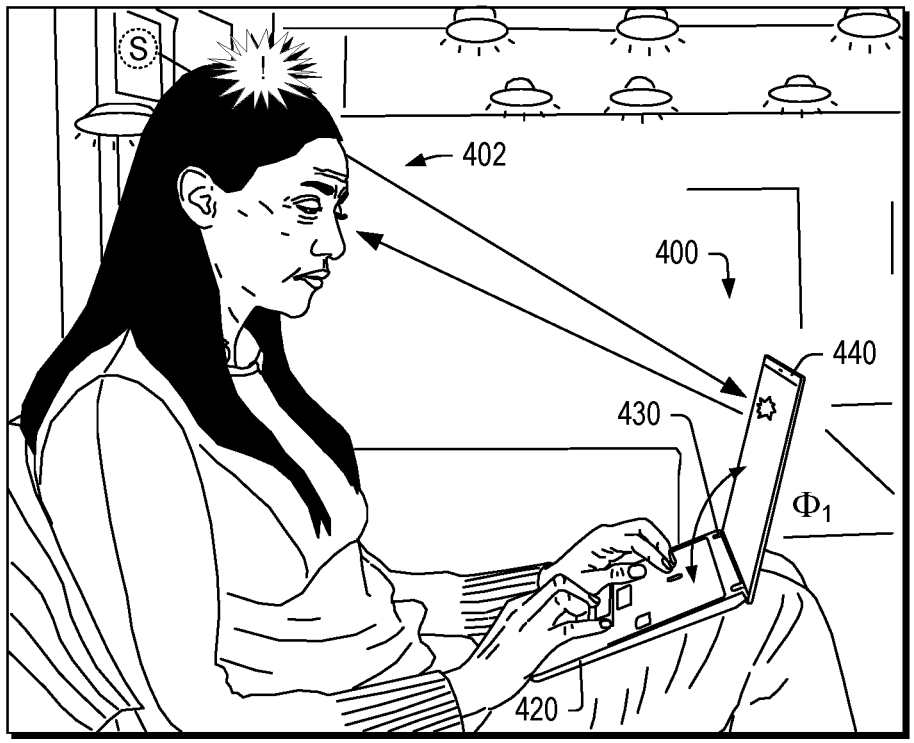
FIG. 4 is a diagram of an example of a system and a user.
Figure 4:
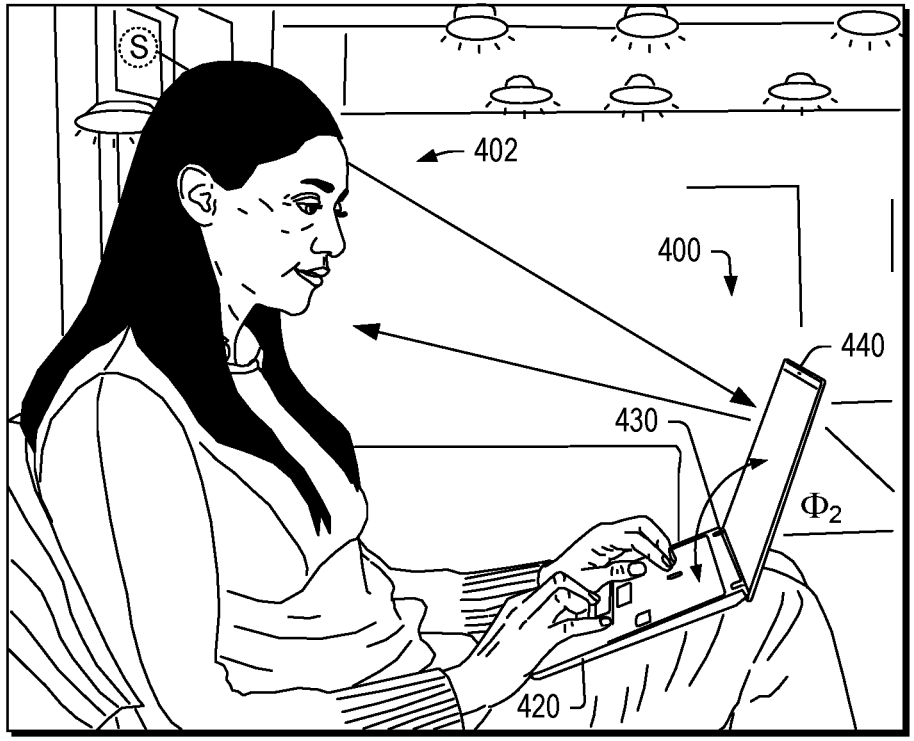

FIG. 4 shows an example of a method with reference to a system 400 and a user 402 in an environment. The environment can be a static environment or a dynamic environment. For example, lighting in the environment may remain steady with respect to time or it may change with respect to time. In the example of FIG. 4, the user 402 remains in a relatively stationary position, though the method may account for movement of the user 402 in the environment.

As to the system 400, it includes a first housing 420, a second housing 440 and one or more hinge assemblies 430 that rotatably couple the first and second housings 420 and 440 such that an angle $\Phi$ can be defined as an opening angle (e.g., an angle of an open orientation of the system 400). In the example of FIG. 4, the display housing 440 can include a display that can be classified, for example, according to a matte, a glossy, a semi-glossy, etc., classification system. As an example, the display housing 440 can include a display that can be classified according to a haze value. For example, consider a zero haze value, a very low haze value, a relatively low haze value, etc. As an example, an effectively glossy surface may be defined as having a haze value less than approximately 10 percent or, for example, less than approximately 5 percent. As explained, an effectively glossy surface may provide a "wet" look, which may be aesthetically pleasing, and an effectively glossy surface may provide for superior quality of rendered content.

As explained, an effectively glossy surface may exhibit increased glare (e.g., reflections) under particular conditions such as, for example, where light is strong and/or where rendered display content is dark.

As an example, the method of FIG. 4 may include determining whether light is strong and/or whether rendered display content is dark, which may be based on one or more thresholds, which may be fixed, learned, relative, etc. For example, the method can include issuing one or more signals responsive to one or more of light being strong, rendered display content being dark, evidence of user discomfort (e.g., squinting, blinking, frowning, moving, etc.), position of a user, position of light, position of a system, position of a housing of a system, orientation of a system (e.g., open clamshell, folded tablet, etc.), activity of a user (e.g., typing, touchpad usage, navigation tool usage, etc.), vibration of a system, etc.

In the example of FIG. 4, the method includes issuing at least one signal for adjusting the opening angle $\Phi$ of the display housing 440. Specifically, in an upper illustration, the user 402 is squinting her eyes and frowning as ambient light is reflected from a display surface of the display housing 440 toward the eyes of the user 402 due at least in part to the angle $\Phi_1$. In a lower illustration, the angle has been changed to a different angle $\Phi_2$, which is an angle that reduces the reflection of the ambient light (e.g., an anti-glare or reduced glare angle).

In the example of FIG. 4, as to reduction of reflection, which may reduce eye strain, etc., a method can include rendering a recommended angle to a display of the display housing 440 such that the user 402 can adjust the system 400 to the recommended angle. As an example, a method can include an adjustment mechanism such as, for example, an electric motor, which can be actuated to adjust the angle of the display housing 440.

As an example, an electric motor can be a stepper motor or another type of electric motor. As an example, consider a relatively small stepper motor that can generate an amount of torque sufficient to cause rotation of a display housing with respect to a keyboard housing. As an example, consider a NEMA 11 type of stepper motor such as, for example, one or more of the 11Y102S-LW4, 11Y202S-LW4 or 11Y302S-LW4 stepper motors of Anaheim Automation (Anaheim, Calif.). Such stepper motors can generate bipolar torque of 8.3 oz-in (e.g., approx. 0.059 N-m), 13.2 oz-in (e.g., approx. 0.093 N-m) and 16.7 oz-in (e.g., approx. 0.12 N-m), respectively. Such stepper motors can be approximate 25 mm in diameter and approximately 30 mm to 50 mm long, with one or more sided shafts. As an example, a step size may be approximately 1.8 degrees (e.g., a step angle of approximately 1.8 degrees).

As to gravity related torque, consider a display housing with a mass of 0.1 kilograms and a lever arm length L of 0.1 m (e.g., hinge axis to center of mass) with an assumed acceleration of gravity of 10 m/s$^2$ then the maximum gravity related torque is approximately 0.1 N-m, which is approximately 14.2 oz-in. As an example, a display housing may be configured to be light-weight and with a center of mass that is closer to a hinge axis edge than an opposing edge. In such an example, an electric motor torque may be matched to the gravity related torque of a display housing, noting that such torque depends on angle of the display housing with respect to the direction of the acceleration of gravity. For example, torque can depend on the opening angle $\Phi$ in a manner where the torque increases (e.g. T=mgL*sin(90−$\Phi$)) as the opening angle $\Phi$ increases in a direction away from vertical. As an example, torque of an electric motor can be sufficient to overcome a frictional force such as that of a friction hinge.

As to determination of a recommended angle, a method can include utilizing one or more sensors. For example, a camera can be a sensor where a field of view of the camera can capture an image where the image can be analyzed to determine a position of a light source, which may be an interior light source, an exterior light source, etc. As an example, an exterior light source can be a street light, a vehicle light, a building light, the sun, the moon, etc. As an example, an exterior light source may change over time, with respect to one or more of position, intensity, color, etc. As an example, a camera can be a sensor where a field of view of the camera can capture an image where the image can be analyzed to determine a position of a user and/or one or more features of a user (e.g., eyes, mouth, etc.). As an example, a method can include determining information as to one or more light sources and information as to a user or users, which may be a viewer or viewers. In such an example, the method can include determining a recommended opening angle of a system to reduce glare caused by the system that may be detrimentally directed toward an eye or eyes of a user.

In the example of FIG. 4, the method may include detecting movement of the system 400 responsive to the user 402 touching the system 400. In response, the method may include adjusting the display housing 440 in a manner that effectively stabilizes a display of the display housing 440. For example, where the user 402 is touch typing in a manner that causes the display housing 440 to vibrate, which may make viewing more difficult, the method can include making one or more adjustments to the display housing 440, for example, as to opening angle, to thereby reduce the vibration. In such an example, a determination may depend on a direction of the acceleration of gravity with respect to the system 400 or a portion thereof. For example, the display housing 440 may be adjusted such that the center of mass of the system 400 is more "balanced" and less impacted by touch typing of the user 402 (e.g., less vibration). As another example, a dynamic approach can include dynamically adjusting the opening angle of the display housing 440 to maintain the display housing 440 in a relatively stable position in response to touching of the keyboard housing 420 by the user 402.

As an example, the method of FIG. 4 can include one or more of assessing glare and assessing movement, where glare can be due to ambient lighting conditions of an environment with respect to position of the system 400 and where movement can be due to a user touching a portion of the system 400. Where utilized in combination, the experience of the user 402 may be improved, particularly with respect to eyestrain.

As explained, the method of FIG. 4 can aim to address one or more issues that may occur during use of the system 400. As explained, one issue can be glare, while another issue can be undesirable display movement. Such issues can be associated with an opening angle of the display housing 440 with respect to the keyboard housing 420 of the system 400 where an adjustment or adjustments to the opening angle may address one or more of such issues.

As to glare, it can make one or more portions of a display illegible, non-viewable, etc. Further, glare can be associated with reflection, where light may be reflected toward an eye or eyes of a user. As to movement, consider typing as an example, where a display housing may wobble due to key strokes that impart force, which may make a keyboard housing move and, hence, a display housing move.

As an example, the system 400 can include a motorized hinge assembly with a lock up system. For example, consider a method that can include actuation of the motorized hinge assembly to adjust a display housing based on one or more inputs, such as, for example, input from one or more cameras, one or more sensors, etc. In such an approach, actuation of the motorized hinge assembly may aim to stabilize the display housing with respect to a user's eye position (e.g., or eyes level, etc.) and/or aim to reduce glare.

As to glare reduction, consider an example that utilizes camera input, where the system 400 can include circuitry for recognizing and locating a light source and a user's eyes and circuitry that can determine a best opening angle of the display housing 440 to reduce glare, which may provide a best view of displayed content based on one or more characteristics of a display of the display housing. In such an example, a motorized hinge assembly may be actuated to cause the system 400 to self-adjust to the determined angle. As an example, a determined angle may account for ergonomics such that a user and a system are more ergonomically arranged. As an example, a system may render a graphic or issue an audio signal to instruct a user to "sit up straight" or "stop slouching", which may help to reduce glare by repositioning of the user's eyes (e.g., via repositioning of the user's head).

As to technology for recognition of one or more features of a user and/or in an environment, consider an article by Ashwash et al., "Eye Gestures Recognition: A Mechanism for Hands-Free Computer Control", Corpus ID: 15970193, 2008 (https://www.semanticscholar.org), which is incorporated by reference herein. The article by Ashwash et al. describes some examples of technologies for recognition as to blinking, winking, eyebrow raising, eyes being closed deliberately, and deliberate eye movements left, right, up and down, etc. Such technology for recognition can be utilized, for example, to recognize squinting, wrinkling, etc., which can indicate that a user may be experiencing discomfort due to glare. As an example, behaviors responsive to glare may be interpreted as discomfort behaviors rather than glare related behaviors; noting that a gesture based approach may be utilized, for example, where a user can indicate undesirable glare by a series of blinks, etc. For example, consider a user making three deliberate blinks in a series over a few seconds to indicate that glare is an issue. In response, a system may analyze input to determine whether an adjustment is possible to reduce glare.

As an example, an image analysis approach may capture and assess images to determine whether particular user behaviors have ceased, commenced, re-commenced, etc. In response, such an approach may analyze images for one or more light sources that may be responsible for such glare where a system can recommend and/or automatically make one or more adjustments for reducing glare. As an example, a system may receive feedback via analysis of camera imagery where the system may tailor a recommended adjustment and/or actual adjustment to optimize a user's experience.

As to locating a light source, consider an image analysis approach that can utilize one or more types of filters, image recognition technique, image partition techniques, etc. For example, a camera may provide a field of view that can capture a source of light or sources of light where one or more camera circuitry adjustments may be made to scale one or more image capture parameters such that a light source does not washout a portion or such a large portion of a captured image. In such an example, the light source may be more particularly located (e.g., akin to reducing exposure time, decreasing aperture size, etc.). As an example, image analysis circuitry and/or camera control circuitry may be utilized to identify, locate, rank, etc., one or more light sources, where one or more of the one or more light sources may be a source of glare (e.g., user discomfort in viewing a display of a computing system).

As mentioned, an approach to multi-dimensionality can include using multiple cameras and/or multiple display housing positions. In such approaches, a multi-dimensional model may be constructed that can include one or more of a user, a computing system and at least one light source. In such a model, ray tracing may be utilized to determine how an adjustment may be able to reduce glare (e.g., reflection of light off a display surface toward a user's eye or eyes). As mentioned, a recommendation can include a recommendation as to computing system adjustment and/or a user position adjustment.

As an example, a system can include one or more control graphics such as a graphical user interface that allows a user to set various control parameters as to determinations, actions, etc., regarding glare, movement, ergonomics, etc.

As an example, a system can include a display housing that includes a display; a keyboard housing that includes a keyboard, a processor and memory accessible to the processor; a sensor operatively coupled to the processor; a hinge assembly that rotatably couples the display housing and the keyboard housing; and adjustment circuitry that determines a recommended position for adjustment of the display housing with respect to the keyboard housing using sensor data generated by the sensor.

Figure 5:
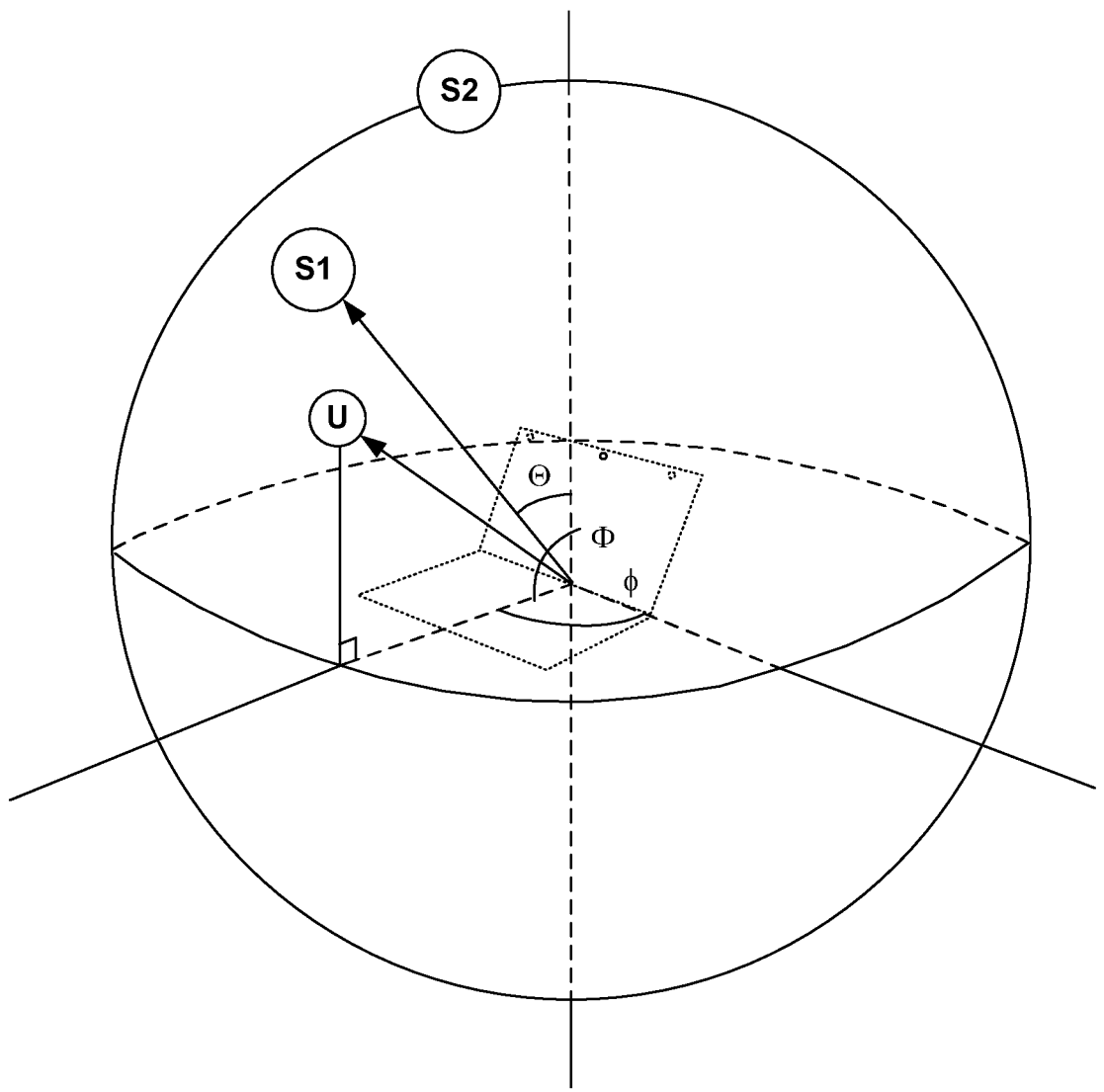
FIG. 5 is a series of diagram of an example of a system with respect to one or more coordinate systems and examples of circuitry of a system.

FIG. 5 shows an example of one or more coordinate systems 500, where an origin may be at a point that references a system such as the system 100 of FIG. 1, the system 400 of FIG. 4, etc. Also shown in FIG. 5 are indicators for positions of a user, U, and one or more sources, S1 and S2. A coordinate system may be a spherical coordinate system, a Cartesian coordinate system or another type of coordinate system. A system can include user tracking circuitry 522 to track a user position, light source tracking circuitry 524 to track one or more light source positions, vibration circuitry 526 to track vibration and glare circuitry 528 to track glare. Such circuitry may utilize one or more coordinate systems, which may include a common coordinate system and/or one or more coordinate system transforms such that determinations as to opening angle θ may be made, directly and/or indirectly.

In the example of FIG. 5, a determination may be made that the light source S1 is causing glare that is detrimental to the user U. As shown, vectors may be utilized, which may include positional vectors, ray tracing vectors, etc. As an example, Snell's law may be utilized. For example, when light travels from a medium with a higher refractive index to one with a lower refractive index, Snell's law seems to require in some cases (whenever the angle of incidence is large enough) that the sine of the angle of refraction be greater than one. This of course is impossible, and the light in such cases is completely reflected by the boundary, a phenomenon known as total internal reflection. The largest possible angle of incidence which still results in a refracted ray is called the critical angle; in this case the refracted ray travels along the boundary between the two media. For a display, multiple media can be involved where one of the media is air, which can have a refractive index of approximately 1 (e.g., by definition). As to a medium of a display, it can have a refractive index greater than 1. In general, as the refractive index increases for a medium adjacent to air, the ability to reflect increases.

As an example, consider sapphire, which has a refractive index greater than approximately 1.7. Sapphire may be utilized as a reference material, as it finds use in making display glass. Another reference material may be GORILLA glass (Corning Incorporate, Corning, N.Y.), which can have a refractive index of approximately 1.5 (e.g., an aluminosilicate glass). Materials such as sapphire and GORILLA glass can be highly reflective. As to anti-glare, a thin, inorganic film material may be applied (e.g., to GORILLA glass, etc.) where, when exposed to the sun or bright light, the material manipulates incoming light, causing light waves to interfere and to some degree cancel each other out to reduce reflection. Such an approach can differ from a matte approach in that less rendered content degradation can be experienced.

As an example, for ray tracing, an incidence angle may be utilized to determine a reflection angle. In geometric optics, the angle of incidence or incidence angle is the angle between a ray incident on a surface and the line perpendicular to the surface at the point of incidence, called the normal. The line representing a ray makes an angle $\theta i$ with the normal. The angle of reflection, $\theta r$, can be equal to the angle of incidence by the law of reflection: $\theta i = \theta r$.

In the example of FIG. 5, the surface for ray tracing can be a display surface of a display of a display housing of a system. For example, the source S1 can emit a ray that is directed toward the display surface to define an angle of incidence from which an angle of reflection can be determined, for an orientation of the display surface in a coordinate system. A reflected ray can be traced to determine if it will likely strike the user, U, for example, one or more eyes of the user or a position proximate to one or more eyes of the user where it may once again reflect to strike a user's eye or eyes. In various sporting activities, an athlete may wear "eye black", which is a black material that is, in theory, supposed to reduce glare. While glare may not be eliminated, it may improve an ability to differentiate between light and dark, enhancing a player's ability to track moving objects in a sunny environment. For a user, U, reflection may occur due to a skin surface, glasses surface, etc. Thus, a ray that lands proximate to an eye or the eyes may be of sufficient concern when assessing whether an adjustment to a display housing opening angle is warranted.

Figure 6:
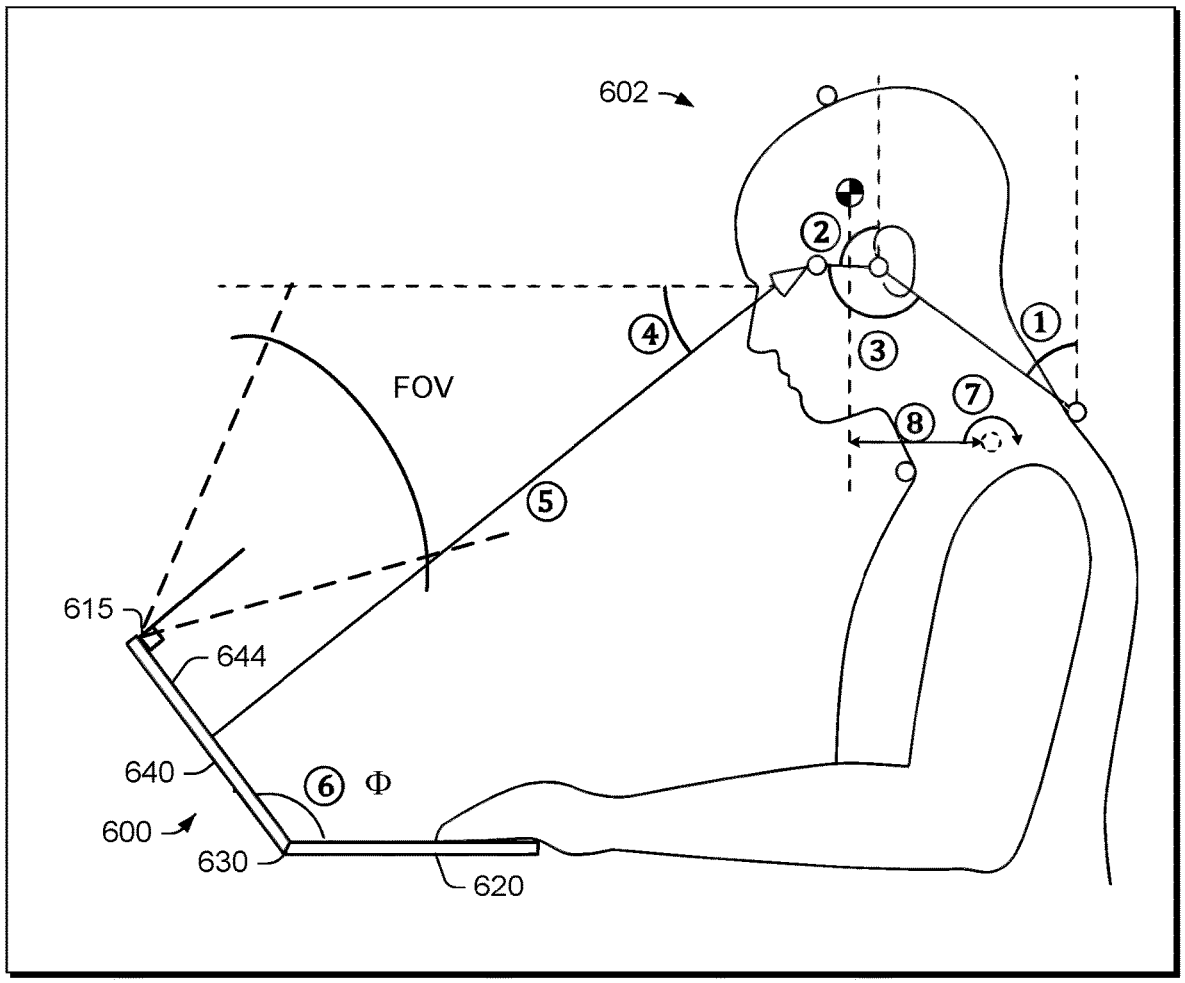
FIG. 6 is a diagram of an example of a system and a user.

FIG. 6 shows an example of a system 600 with respect to a user 602 where the system 600 includes a camera 615, a first housing 620, a second housing 640 with a display surface 644 and a hinge assembly 630. FIG. 6 also shows various references to angles, distances, etc., which may be considered to be variables, including a neck flexion angle (1), a head flexion angle (2), a cranio-cervical angle (3), a gaze angle (4), a gaze distance (5), a laptop tilt angle (6) or opening angle $\Phi$, a gravitational moment on the neck (7), and a gravitational moment-arm of the neck (8). As mentioned, a system can include circuitry that can detect a user and can recommend a change in position of the user, which may aim to improve ergonomics (e.g., to recommend a change in a user's neck flexion angle, head flexion angle, cranio-cervical angle, gaze angle, gaze distance, etc.

As shown in FIG. 6, the camera 615 of the system 400 can have a field of view (FOV) that can capture an image of the user 602 and a portion of the environment, which may include one or more light sources. Where the hinge assembly 630 is a motorized hinge assembly, it may automatically adjust the opening angle $\Phi$ or do so responsive to input received via a human input device (HID). For example, if the system 400 renders a graphic viewable at the display surface 644 that indicates a recommended angle, the user 602 may utilize a HID to instruct the system 400 to adjust the opening angle $\Phi$.

As an example, a system may utilize one or more field of views (FOVs). For example, consider a wide FOV for identifying one or more light sources and a narrower FOV for identifying a user and/or one or more features of a user (e.g., eyes, mouth, etc.). As an example, a FOV may be controlled via one or more optical elements and/or via one or more types of circuitry (e.g., digital zoom, etc.). As mentioned, a coordinate system or coordinate systems may be utilized to specify positions of a user, users, a light source, light sources, etc. As an example, a system may utilize a coordinate system that includes a location for the system or a portion thereof.

For example, a system may be aware of a camera position (e.g., an optical axis direction, etc.) and of an opening angle between housings. As an example, a housing or housings can include one or more sensors. For example, consider one or more of an accelerometer, a gyroscope, a gravity sensor, etc. As an example, a display housing can include one or more sensors where an angle of a direction of the acceleration of gravity can be determined with respect to a plane defined by a display surface of a display of the display housing. Such an angle may be utilized to determine whether an adjustment to the angle is to increase the angle or decrease the angle. For example, to reduce glare, one direction of rotation may be better than another, however, there may be a different relationship as to ergonomics. In such an example, a system can consider ergonomics to determine what direction to rotate to reduce glare, even though the direction may not be the best direction for glare reduction. In other words, a system may rank ergonomics (e.g., as to viewing position) over glare reduction.

As mentioned with respect to FIG. 5, a system can include a vibration sensor, which may be an accelerometer, a gyroscope, etc. As an example, a sensor may provide for output that can be utilized for one or more purposes (e.g., orientation, position, vibration, etc.).

As an example, a camera can be a sensor. As an example, a system can include one or more cameras. Where a system include multiple cameras, stereoscopic images may be captured, which may provide for 3D determinations as to one or more positions (e.g., as to a user, a light source, etc.). As mentioned, a 3D determination may include multi-dimensional modeling and, for example, ray tracing.

As an example, a system can include a motorized hinge assembly that can adjust a display housing where a method may include capturing an image at a first opening angle, adjusting the opening angle to a second opening angle, capturing another image at the second opening angle, and utilizing the images to triangulate or otherwise determine a position in space of an object (e.g., a user, a light source, etc.). In such an example, the difference in the angles may be greater than 1 degree and less than 90 degrees. For example, consider an automated method that adjusts the opening angle by approximately 2 degrees to 10 degrees to capture one or more images, for example, for at least two different angles. As an example, a method can include capturing multiple images (e.g., video) while an opening angle is adjusted and then analyzing at least a portion of the multiple images to determine a position in space of an object or objects.

As an example, where a light source is the sun (e.g., or the moon), a system may include location circuitry (e.g., via GPS, WiFi, IP address, etc.) that can determine an approximate location of the system where a time and day can be utilized to determine a trajectory of the light source where the system may determine one or more angles to utilize for adjustments, for example, according to an adjustment schedule. In such an example, consider adjustments occurring at time increments that depend on movement of the sun in the sky.

Figure 7:
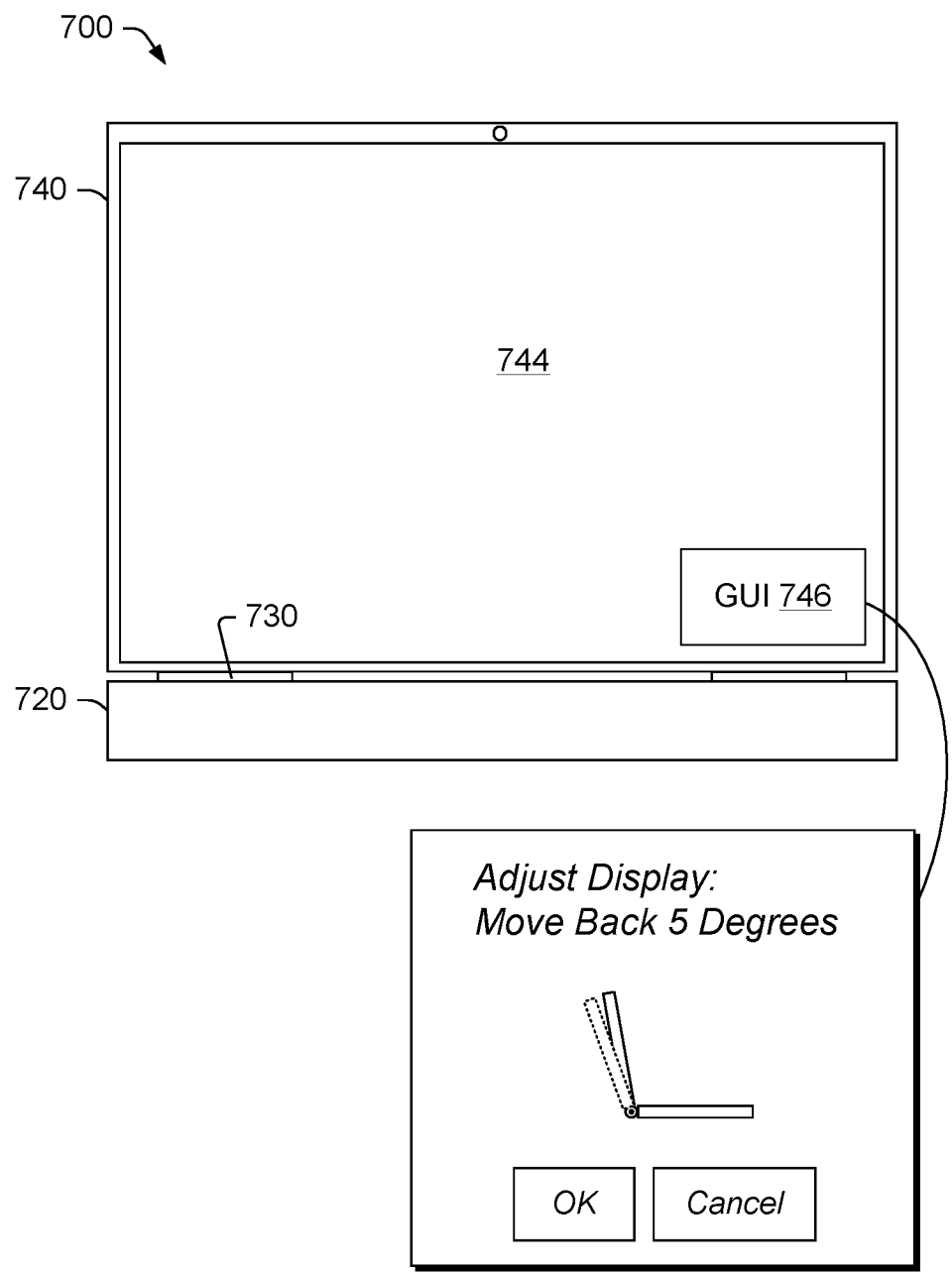
FIG. 7 is a series of diagrams of an example of a system and an example of a graphical user interface.

FIG. 7 shows an example of a system 700 that includes a first housing 720, a second housing 740, a hinge assembly 730 that rotatably couples the first housing 720 and the second housing 740, a display 744 and a graphical user interface (GUI) 746. As shown, the system 700 can generate the GUI 746 that includes information as to an adjustment of the display housing 740, which, in the example of FIG. 7, is to "move back 5 degrees". Such a GUI can include one or more other types of information that may, for example, help guide or inform a user. For example, the GUI 746 shows a graphic of the system 700 where a current position of the display housing 740 is shown and where a recommended position of the display housing 740 is shown. As mentioned, one or more sensors may be included in the system 700 that can generate sensor data that can be sufficient to determine a current position of the display housing 740 (e.g., directly and/or indirectly).

Figure 8:
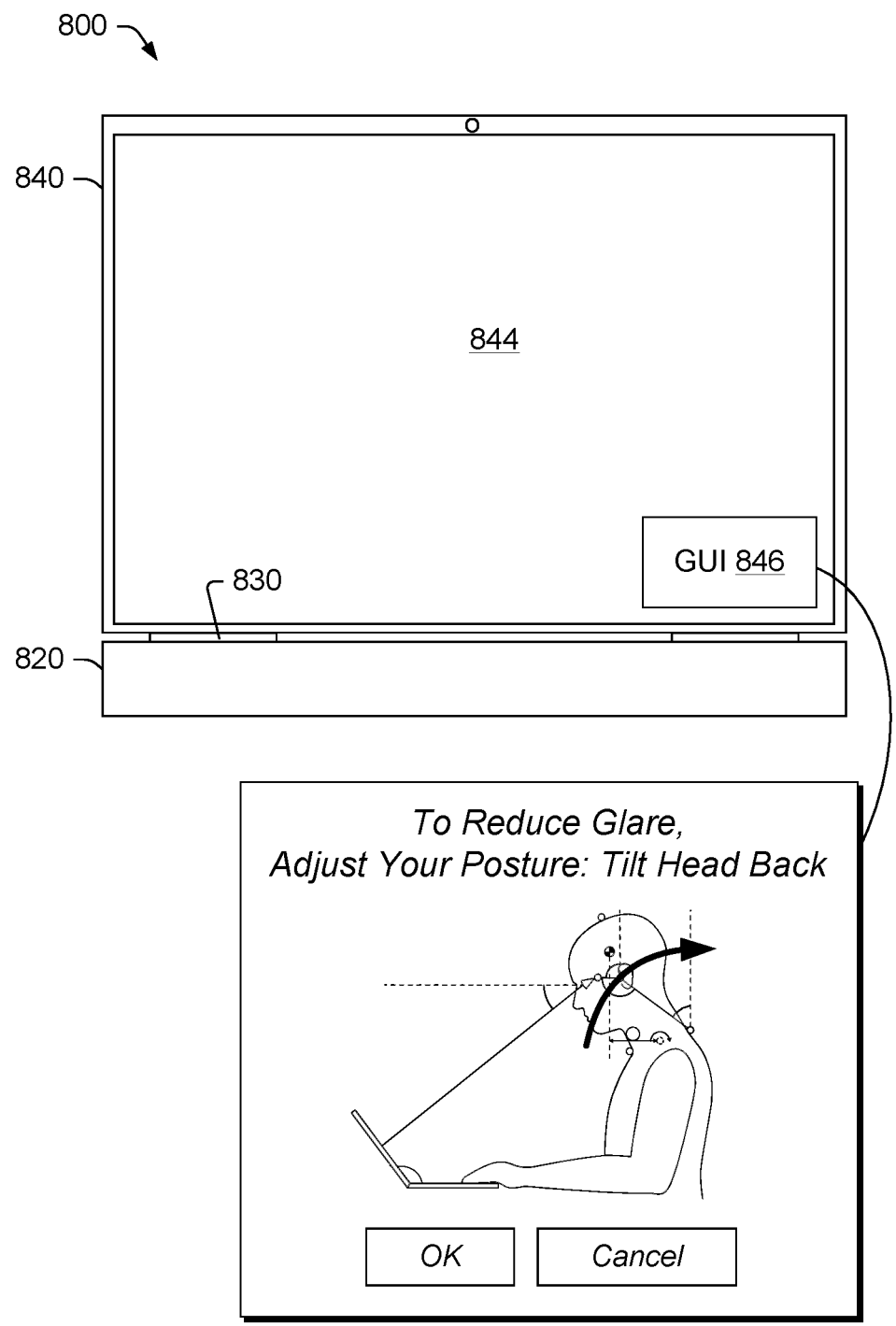
FIG. 8 is a series of diagrams of an example of a system and an example of a graphical user interface.

FIG. 8 shows an example of a system 800 that includes a first housing 820, a second housing 840, a hinge assembly 830 that rotatably couples the first housing 820 and the second housing 840, a display 844 and a graphical user interface (GUI) 846. As shown, the system 800 can generate the GUI 846 that includes information as to an adjustment of a user, which, in the example of FIG. 8, is "to reduce glare, adjust your posture: tilt head back". Such a GUI can include one or more other types of information that may, for example, help guide or inform a user. For example, the GUI 846 shows a graphic of the system 800 and a user (e.g., an avatar of the user) where a recommended direction of adjustment of the user position is shown. As mentioned, one or more sensors may be included in the system 800 that can generate sensor data that can be sufficient to determine a current position of a user (e.g., directly and/or indirectly).

As an example, where multiple users are positioned in an environment with respect to a display, a system may determine eye position and optionally eye gaze of each of the users. In such an example, an optimal multi-user angle may be recommended for a display of the system or, for example, where the system determines that fewer than all of the users are gazing at the display, the system may determine an optimal angle for the user or users that are gazing at the display. In such an example, the optimal angle can account for glare such that the optimal angle is an anti-glare angle.

As mentioned, a hinge assembly may be a swivel hinge assembly that provides for swiveling of a display housing. In such an example, a recommended angle may be determined that is a swivel angle. For example, in the coordinate system 500 of FIG. 5, which is shown as a spherical coordinate system, where the illustrated system includes a swivel hinge, a recommended angle may be in the direction of the angle (I).

Figure 9:
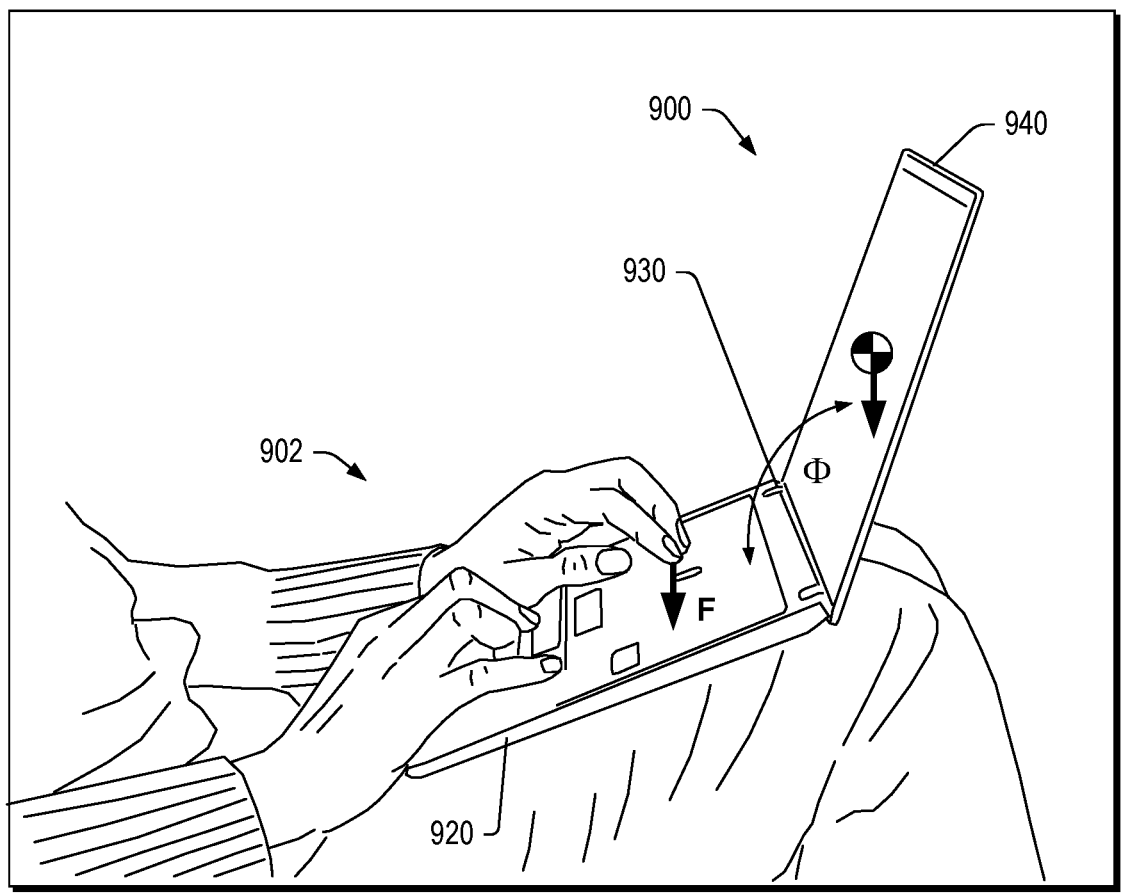
FIG. 9 is a series of diagrams of an example of a system and a user and an example of a plot of sensor data.
Figure 9:
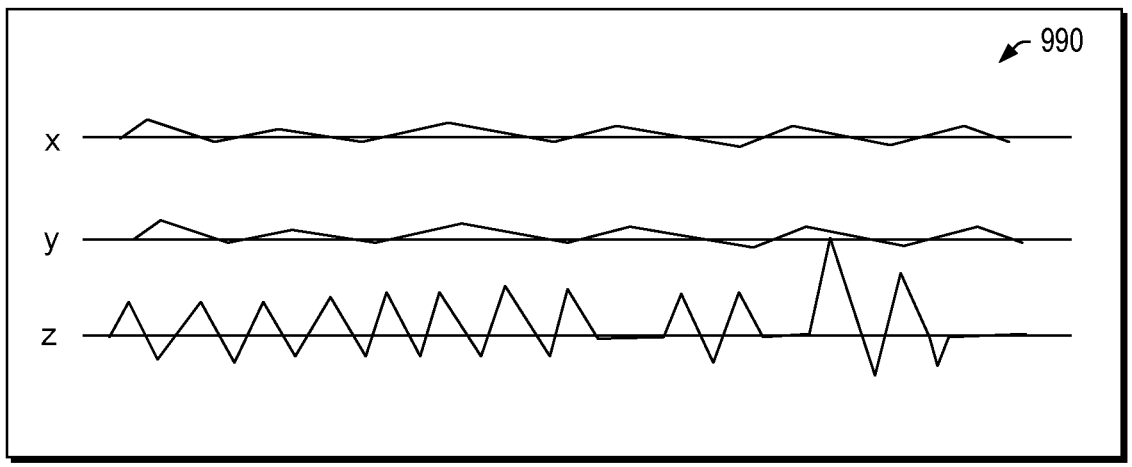

FIG. 9 shows an example of a system 900 and a user 902 where the user 902 is interacting physically with the system 900. As shown, the system 900 can include a first housing 920, a second housing 940 and a hinge assembly 930 that rotatably couples the first housing 920 and the second housing 940. In such an example, the hinge assembly 930 can be a motorized hinge assembly.

In the example of FIG. 9, the system 900 can include one or more sensors that can acquire sensor data as to consequences of the user 902 interacting with the system 900. For example, consider multiple accelerometers, one or more multi-axis accelerometers, etc. In such an example, one or more time series of data may be acquired, as illustrated in a plot 990 as time series along an x-axis, a y-axis and a z-axis. In the plot 990, the z-axis may represent substantially upward and downward motion, which may, for example, cause the display housing 940 to shake. As shown, the display housing 940 can include a center of mass that can be at a position that defines a lever arm with respect to an axis of the hinge assembly 930. In such an example, as the keyboard housing 920 moves responsive to movements of the user 902, the display housing 940 may shake in a manner that causes torque about the axis of the hinge assembly 930, which may result in movements of the display housing 940, which can include slipping as force may overcome a friction force of the hinge assembly 930. As an example, the system 900 may recommend that the opening angle Φ of the system 900 be adjusted, which may act to reduce the torque about the axis of the hinge assembly 930. For example, torque can depend on the opening angle Φ in a manner where the torque increases (e.g. T=mgL*sin(90−Φ)) as the opening angle Φ increases in a direction away from vertical. Thus, a recommended adjustment may be to decrease the opening angle Φ or otherwise move the plane of the display of the display housing 940 more toward vertical.

As an example, a motorized hinge assembly may be engaged in a manner where it acts to stabilize the display housing 940. For example, consider a gimbal approach where the motorized hinge assembly can counteract movements. As an example, a motor can be a brushless DC electric motor, which may be an electronically commutated motor or synchronous DC motor. As an example, a motor may be powered by DC electricity via an inverter or switching power supply which produces an AC electric current to drive each phase of the motor via a controller (e.g., closed loop). As an example, a controller can provide pulses of current to the motor windings that control the speed and torque of the motor.

As an example, a brushless DC electric motor may be utilized to adjust a direction of one or more components of a system. As an example, an adjustment assembly can include one or more electric motors. As an example, an adjustment assembly can include one or more features of a motorized gimbal such as, for example, a gimbal configured for a video camera of a drone or a handheld gimbal for a video camera.

Figure 10:
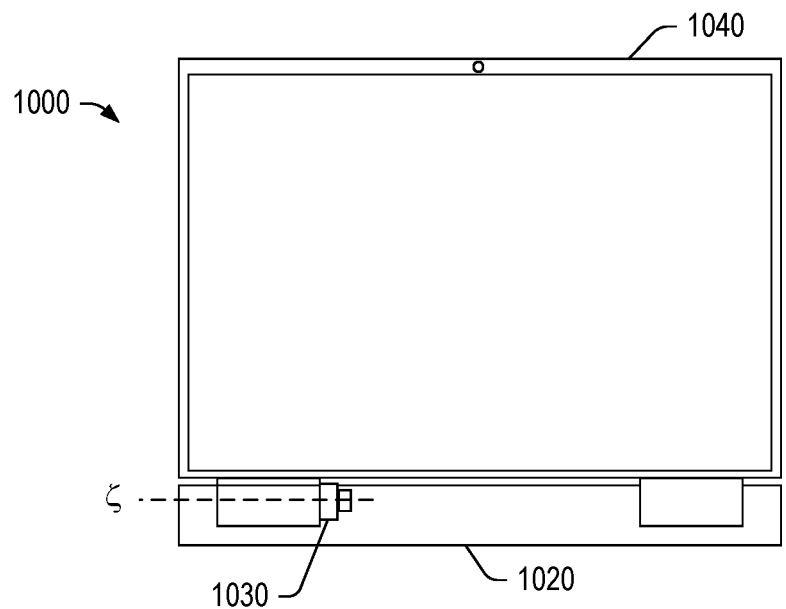
FIG. 10 is a series of diagrams of an example of a system.
Figure 10:
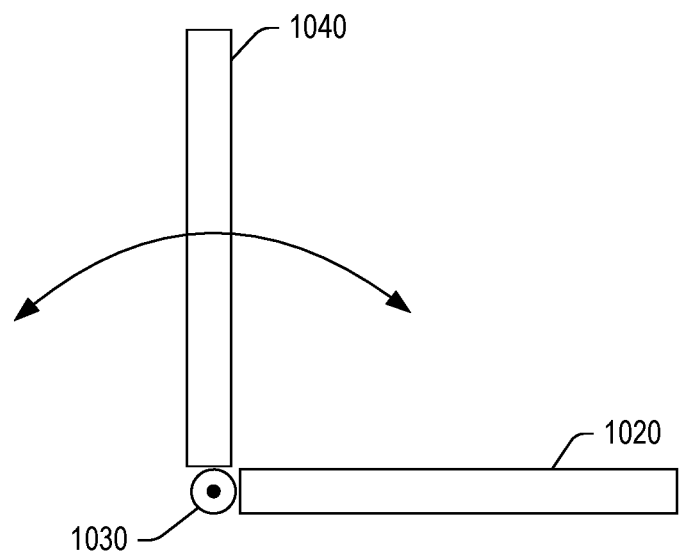

FIG. 10 shows an example of a system 1000 that includes a first housing 1020, a second housing 1040 and a motorized hinge assembly 1030 that includes an electric motor that can be powered by a power supply of the system 1000 (e.g., a battery or batteries) and/or via a supply cable (e.g., an electrical power cord, etc.). As explained, a system can include circuitry that can actuate an electric motor of a motorized hinge assembly to cause a housing to move (e.g., rotate about an axis of the motorized hinge assembly). As an example, where a system includes a swivel hinge, it may be centrally mounted between left and right sides of a system and may provide for rotating and swiveling. As an example, a system may include one or more electric motors that can be actuated to cause movement of a housing of the system.

Figure 11:
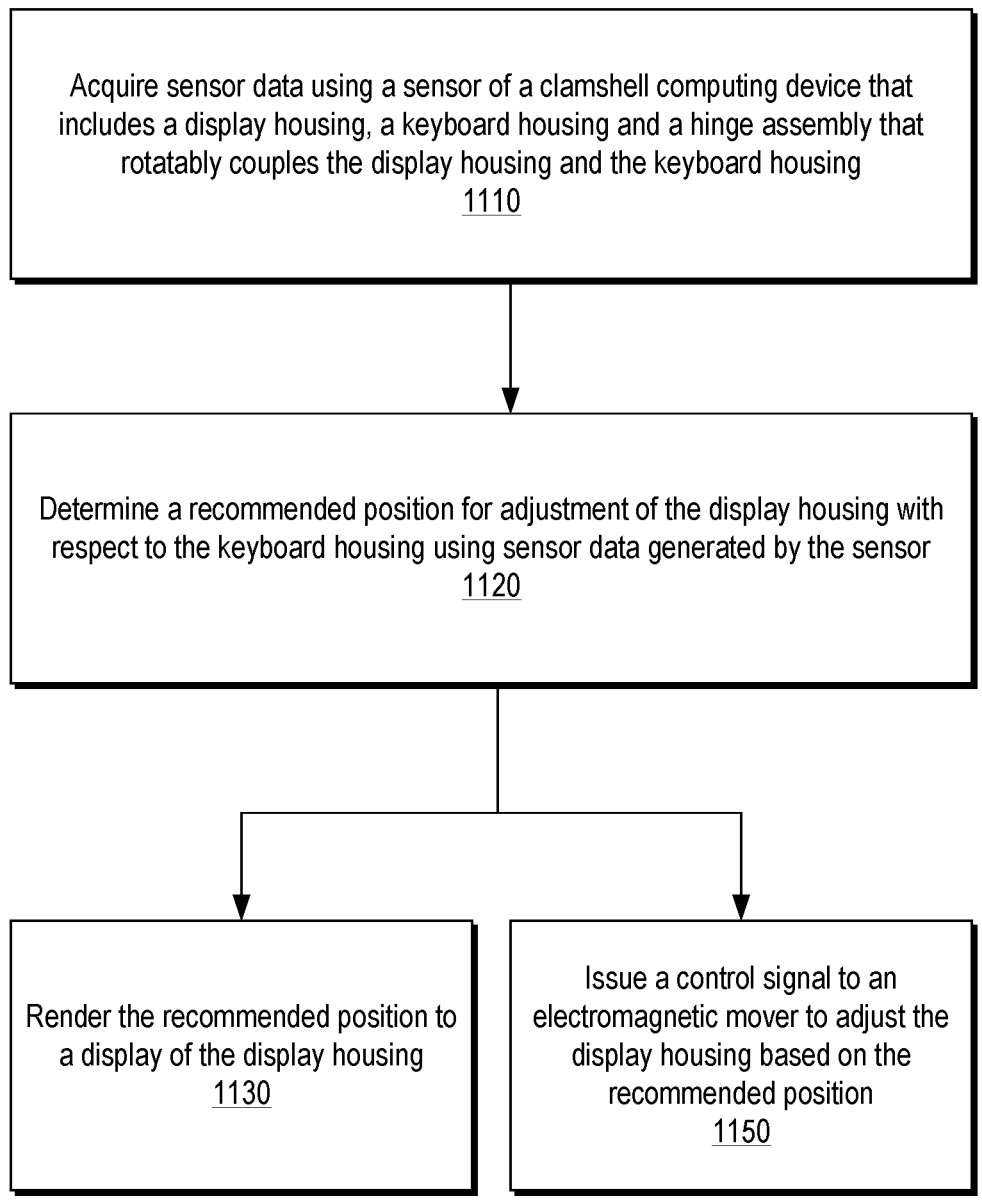
FIG. 11 is a diagram of an example of a method.

FIG. 11 shows an example of a method 1100 that includes an acquisition block 1110 for acquiring sensor data using a sensor of a clamshell computing system that includes a display housing, a keyboard housing and a hinge assembly that rotatably couples the display housing and the keyboard housing; and a determination block 1020 for determining a recommended position for adjustment of the display housing with respect to the keyboard housing using sensor data generated by the sensor. As shown, the method 1100 may include a render block 1130 for rendering the recommended position to a display of the display housing and/or an issuance block 1150 for issuing a control signal to an electromagnetic mover to adjust the display housing based on the recommended position.

As an example, a system can include a display housing that includes a display; a keyboard housing that includes a keyboard, a processor and memory accessible to the processor; a sensor operatively coupled to the processor; a hinge assembly that rotatably couples the display housing and the keyboard housing; and adjustment circuitry that determines a recommended position for adjustment of the display housing with respect to the keyboard housing using sensor data generated by the sensor. In such an example, the sensor can be or include a camera that generates image data. In such an example, the image data can include light source data for at least one light source. As an example, light source data can include artificial light source data and/or natural light source data.

As an example, image data can include user position data for at least one user. In such an example, the user position data can include user eye position data. As an example, image data can include time series data that can indicate one or more types of behaviors of a user, changes in a light source, changes in a number of light sources, etc.

As an example, sensor data can include sensor data for at least two different positions of a display housing with respect to a keyboard housing. In such an example, the sensor data for the different positions may be utilized to construct a multi-dimensional model, which may include, for example, a user and one or more light sources, which may be referenced with respect to at least a portion of a computing system.

As an example, sensor data can include time series data for at least one member of a group that includes a position of a display housing, a position of a keyboard housing, and a relative position between a display housing and a keyboard housing (e.g., of a clamshell computing system).

As an example, adjustment circuitry can issue a signal or signals that call for rendering a position indicator to a display of a display housing that indicates a position of the display housing with respect to a keyboarding housing (e.g., of a clamshell computing system).

As an example, a system can include adjustment circuitry that, responsive to a dynamic change in the position of a display housing with respect to a keyboard housing, issues one or more signals that call for dynamic rendering of at least one position indicator to a display of the display housing that indicates at least one position of the display housing with respect to the keyboarding housing.

As an example, a system can include adjustment circuitry that can issue one or more signals that call for rendering a recommended position for adjustment of a display housing to a display of the display housing. In such an example, the recommended position can be an angle defined between the display housing and a keyboard housing where a hinge assembly rotatably couples the display housing and the keyboard housing. As an example, adjustment circuitry can call for terminating rendering of a recommended position responsive to determination of a position of a display housing being within a range of the recommended position. For example, consider a sensor that can detect position of a display housing (e.g., directly and/or indirectly) where a comparison can be made between a detected position and a recommended position to determine if the position of the display housing is within a range of the recommended position (e.g., within +/−a degree, two degrees or three degrees).

As an example, a system can include generating a recommended position for adjustment of a display housing where the recommended position is a recommended anti-glare position. In such an example, the system may utilize one or more images, a spatial model and ray tracing.

As an example, sensor data can include keyboard vibration data. In such an example, a recommended position for adjustment of a display housing may be a recommended anti-vibration stabilization position. For example, consider an adjustment that may reduce gravity related torque of a display housing about a hinge axis of a hinge assembly that rotatably couples the display housing to a keyboard housing. In such an example, a reduction in gravity related torque may result in lesser movement of the display housing responsive to vibration of the keyboard housing.

As an example, a system can include an electromagnetic mover operatively coupled to adjustment circuitry and a hinge assembly. In such an example, the electromagnetic mover can operate to move a display housing based on a recommended position for adjustment of the display housing where the hinge assembly rotatably couples the display housing to a keyboard housing of the system. As an example, sensor data can include keyboard vibration data where, for example, a recommended position for adjustment of a display housing can be a recommended anti-vibration stabilization position. As an example, sensor data can include image data where a recommended position for adjustment of a display housing can be a recommended anti-glare position.

As an example, a method can include acquiring sensor data using a sensor of a clamshell computing device that includes a display housing, a keyboard housing and a hinge assembly that rotatably couples the display housing and the keyboard housing; and determining a recommended position for adjustment of the display housing with respect to the keyboard housing using sensor data generated by the sensor. In such an example, the method can include rendering the recommended position to a display of the display housing. As an example, a method can include instructing an electromagnetic mover to adjust a position of the display housing using a recommended position. As an example, a sensor may be or include a vibration sensor and/or a camera. As an example, sensor data can include image-based vibration data and/or image-based glare data.

As an example, one or more computer-readable storage media can include processor-executable instructions executable to instruct a computing device to: acquire sensor data using a sensor of a clamshell computing device that includes a display housing, a keyboard housing and a hinge assembly that rotatably couples the display housing and the keyboard housing; and determine a recommended position for adjustment of the display housing with respect to the keyboard housing using sensor data generated by the sensor.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 12:
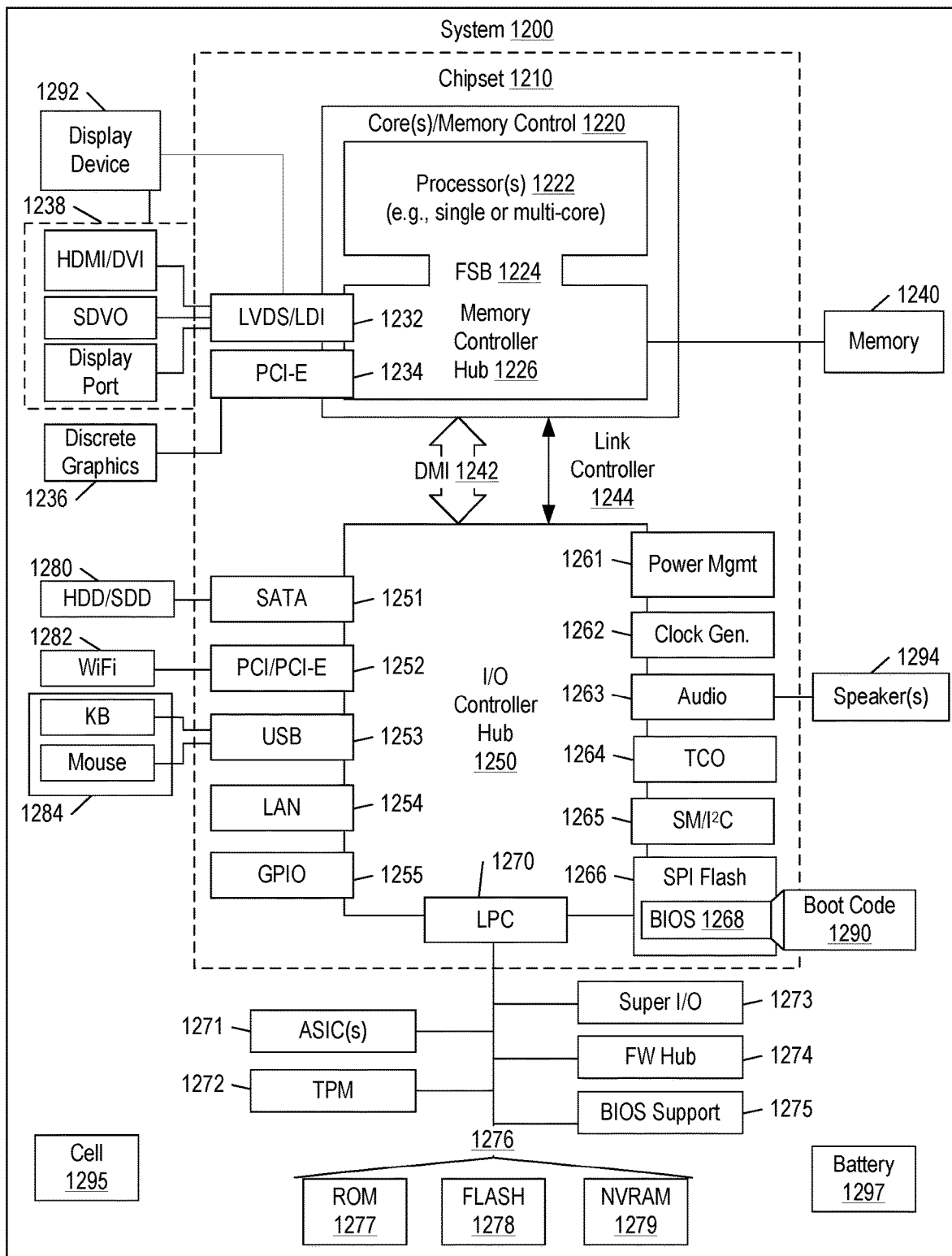
FIG. 12 is a diagram of an example of a system that includes one or more processors.

While various examples of circuits or circuitry have been discussed, FIG. 12 depicts a block diagram of an illustrative computer system 1200. The system 1200 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 1200. As an example, a system such as the system 100 of FIG. 1 may include at least some of the features of the system 1200.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I$^2$C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I$^2$C interface (see, e.g., the SM/I$^2$C interface 1265), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
   a display housing that comprises a display classified according to a haze value;
   a keyboard housing that comprises a keyboard, a processor and memory accessible to the processor;
   a sensor operatively coupled to the processor;
   a hinge assembly that rotatably couples the display housing and the keyboard housing; and
   adjustment circuitry that determines a recommended open angle for adjustment of the display housing with respect to the keyboard housing, using sensor data generated by the sensor, for orientation of the display housing in relationship to at least one environmental condition, wherein the recommended open angle for adjustment of the display housing comprises a recommended anti-glare position that reduces glare from light of a light source being reflected by the display of the display housing, and wherein the glare depends at least in part on the haze value of the display.

2. The system of claim 1, wherein the sensor comprises a camera that generates image data.

3. The system of claim 2, wherein the at least one environmental condition comprises at least the light source and wherein the image data comprise light source data for at least the light source.

4. The system of claim 2, wherein the at least one environmental condition comprises a user position and wherein the image data comprise user position data for the user position.

5. The system of claim 4, wherein the user position data comprise user eye position data.

6. The system of claim 1, wherein the sensor data comprise sensor data for at least two different positions of the display housing with respect to the keyboard housing and with respect to at least one of the at least one environmental condition.

7. The system of claim 1, wherein the sensor data comprise time series data for at least one member of a group consisting of a position of the display housing with respect to at least one of the at least one environmental condition, and a position of the keyboard housing with respect to at least one of the at least one environmental condition.

8. The system of claim 1, wherein the adjustment circuitry calls for rendering an angle indicator to the display that indicates the recommended open angle of the display housing with respect to the keyboard housing.

9. The system of claim 1, wherein, responsive to a dynamic change in the position of the display housing with respect to the keyboard housing, the adjustment circuitry calls for dynamic rendering of at least one angle indicator to the display that indicates at least one new recommended open angle of the display housing with respect to the keyboard housing.

10. The system of claim 1, wherein the adjustment circuitry calls for rendering the recommended open angle for adjustment of the display housing to the display.

11. The system of claim 10, wherein the adjustment circuitry calls for terminating the rendering of the recommended open angle responsive to determination of an angle of the display housing being within a range of the recommended open angle.

12. The system of claim 1, comprising an electromagnetic mover operatively coupled to the adjustment circuitry and the hinge assembly, wherein the electromagnetic mover operates to move the display housing based on the recommended open angle for adjustment of the display housing.

13. A method comprising:
acquiring sensor data using a sensor of a clamshell computing device that comprises a display housing, a keyboard housing and a hinge assembly that rotatably couples the display housing and the keyboard housing, wherein the display housing comprises a display classified according to a haze value; and
determining a recommended open angle for adjustment of the display housing with respect to the keyboard housing, using sensor data generated by the sensor, for orientation of the display housing in relationship to at least one environmental condition, wherein the recommended open angle for adjustment of the display housing comprises a recommended anti-glare position that reduces glare from light of a light source being reflected by the display of the display housing, and wherein the glare depends at least in part on the haze value of the display.

14. The method of claim 13, comprising rendering the recommended open angle to a display of the display housing.

15. The method of claim 13, comprising instructing an electric motor to adjust the position of the display housing using the recommended open angle.

16. One or more computer-readable storage media comprising processor-executable instructions executable to instruct a clamshell computing device to:
acquire sensor data using a sensor of the clamshell computing device that comprises a display housing, a keyboard housing and a hinge assembly that rotatably couples the display housing and the keyboard housing, wherein the display housing comprises a display classified according to a haze value; and
determine a recommended open angle for adjustment of the display housing with respect to the keyboard housing, using sensor data generated by the sensor, for orientation of the display housing in relationship to at least one environmental condition, wherein the recommended open angle for adjustment of the display housing comprises a recommended anti-glare position that reduces glare from light of a light source being reflected by the display of the display housing, and wherein the glare depends at least in part on the haze value of the display.

17. The system of claim 1, wherein the haze value is less than 25 percent.

18. The system of claim 1, wherein the haze value is less than 10 percent.

* * * * *